INVENTOR.
GERALD D. PATTERSON
BY
Griswold & Burdick
ATTORNEYS

SUBSURFACE UNIT

INVENTOR.
GERALD D. PATTERSON

BY
GRISWOLD AND BURDICK
ATTORNEYS

United States Patent Office 3,436,720
Patented Apr. 1, 1969

3,436,720
SONAR APPARATUS FOR MEASURING UNDERGROUND CAVERNS
Gerald D. Patterson, Tulsa, Okla., assignor to The Dow Chemical Company, Midland, Mich., a corporation of Delaware
Filed Oct. 10, 1966, Ser. No. 585,353
Int. Cl. G01s 9/66
U.S. Cl. 340—3                                6 Claims

ABSTRACT OF THE DISCLOSURE

This invention is an apparatus for measuring an underground fluid containing cavern including means of calibration for the speed of sound transmission of the cavern fluid. More particularly, the invention is for a cavern measuring apparatus including indicator means for sequentially displaying lapsed time intervals, a sound transmitting element and a sound receiving element supported at a preselected distance from each other in the cavern fluid, transmitter and receiving means having connection to the sound transmitting element and sound receiving element including means of applying sound producing voltage pulses to said transmitting element in response to sound pulses received through the cavern fluid by said sound receiving element to establish a regenerated pulse repetition frequency signal proportional to the speed of the sound transmission of cavern fluid, means of applying the pulse repetition frequency signal to the indicator, means of calibrating the indicator whereby the indicator may be regulated to display indicia of time elapsed for the transmission of sound in the cavern fluid, and measuring sound transmitting receiving means in the caverns providing elapsed time measuring signals in response to the sequential transmission of sound waves in the cavern fluid which signals may be applied to the calibrated indicator to display a calibrated outline of the cavern wall.

---

This invention relates to a sonar type apparatus for use in measuring underground caverns. More particularly, the invention relates to a sonar type apparatus for measuring underground gas or liquid, i.e., fluid containing caverns including means of calibration for the speed of sound transmission of the cavern fluid.

The use of the sonar type apparatus for measuring underground caverns is well known in the art. Such devices are primarily used as industrial tools for measuring solution-mined cavities although the same principle may be used for measuring well bore holes. The type of device to which this invention pertains functions basically by emitting a series of sound pulses from a central point in the cavern, receiving the echo from the cavern wall, and indicating the distance from the point of transmission to the wall cavern by measuring the time interval between transmission and reception of the sound pulse. In one arrangement the transducer device which imparts the sound pulse in the cavern fluid and receives the echo from the cavern wall is rotated in synchronization with a plan position indicator oscilloscope so that the interior configuration of the cavity walls is displayed on the scope face. Typically, the plan position indicator display has superimposed thereon concentric distance markers so that measurement of the cavern walls from a central point is shown. If required, photographs may be made of the scope face with the circumferential distance markers superimposed thereon for detailed study of the cavern configuration.

Since the display of the cavern outline on the indicator is a function of the time interval of the transmission of sound from the transducer to the cavern wall and the echo return, the displayed measurement is a function of the speed of sound transmission in the liquid or gas in the cavern. Therefore, in order for the display representation of the configuration of the cavern walls to be accurately interpreted, it is necessary to know the speed of sound transmission of the cavern fluid. Generally the measurement of a cavern is required during solution mining to ascertain when the cavern has reached the required size and therefore water is the fluid most commonly encountered by apparatus of the type of the invention. The speed of sound transmission in water varies considerably according to two primary factors, that is, chemical content and temperature. As an example, the approximate velocity of sound transmission of fresh water is 4,500 feet per second, while the speed of sound transmission of water heavily saturated with salt is approximately 6,500 feet per second. Thus, it can be seen that no accurate sonar type measurement of a fluid contained cavern can be made without calibration for the speed of sound transmission of the cavern fluid.

The most usual means of calibrating for the speed of sound transmission of cavern fluid requires taking a sample of the fluid, bringing it to the surface, and analyzing the sample to ascertain the temperature and concentration of salt or other chemicals. This process is time consuming. It is difficult to accurately ascertain the temperature of cavern fluid as it actually exists in the cavern since the temperature of the sample may change as it is brought to the surface. Frequently when concentrated brine solution samples are brought to the surface and the temperature thereof lowered, portions of the salt content solidifies out of the solution and therefor an inaccurate chemical analysis results in the assignment to the fluid of an erroneous speed of sound transmission. By the method of calibration used wherein samples of the cavern fluid are recovered for analysis, a necessary step includes the application of the correction factor to the indicator visual display of the cavern and this is also time consuming and a source of possible error.

It is therefore an object of this invention to provide a sonar type apparatus for measuring fluid containing underground caverns including means of calibrating the apparatus for the speed of sound transmission of the cavern fluid.

More particularly, an object of this invention is to provide a sonar type apparatus for measuring underground fluid containing caverns including means of calibration for the speed of sound transmission of the cavern fluid by the same instrument utilized for measuring the cavern and in an arrangement wherein the taking of a sample of the cavern fluid is not required.

Another object of this invention is to provide a sonar type apparatus for measuring underground fluid containing caverns including means for calibration of the apparatus for the speed of sound transmission of cavern fluid in an arrangement wherein neither a chemical analysis nor the actual speed of sound transmission of the cavern fluid need be known by the apparatus operator.

These and other objects will be understood with reference to the following description and claims, taken in conjunction with the attached drawings in which:

Figure 1:
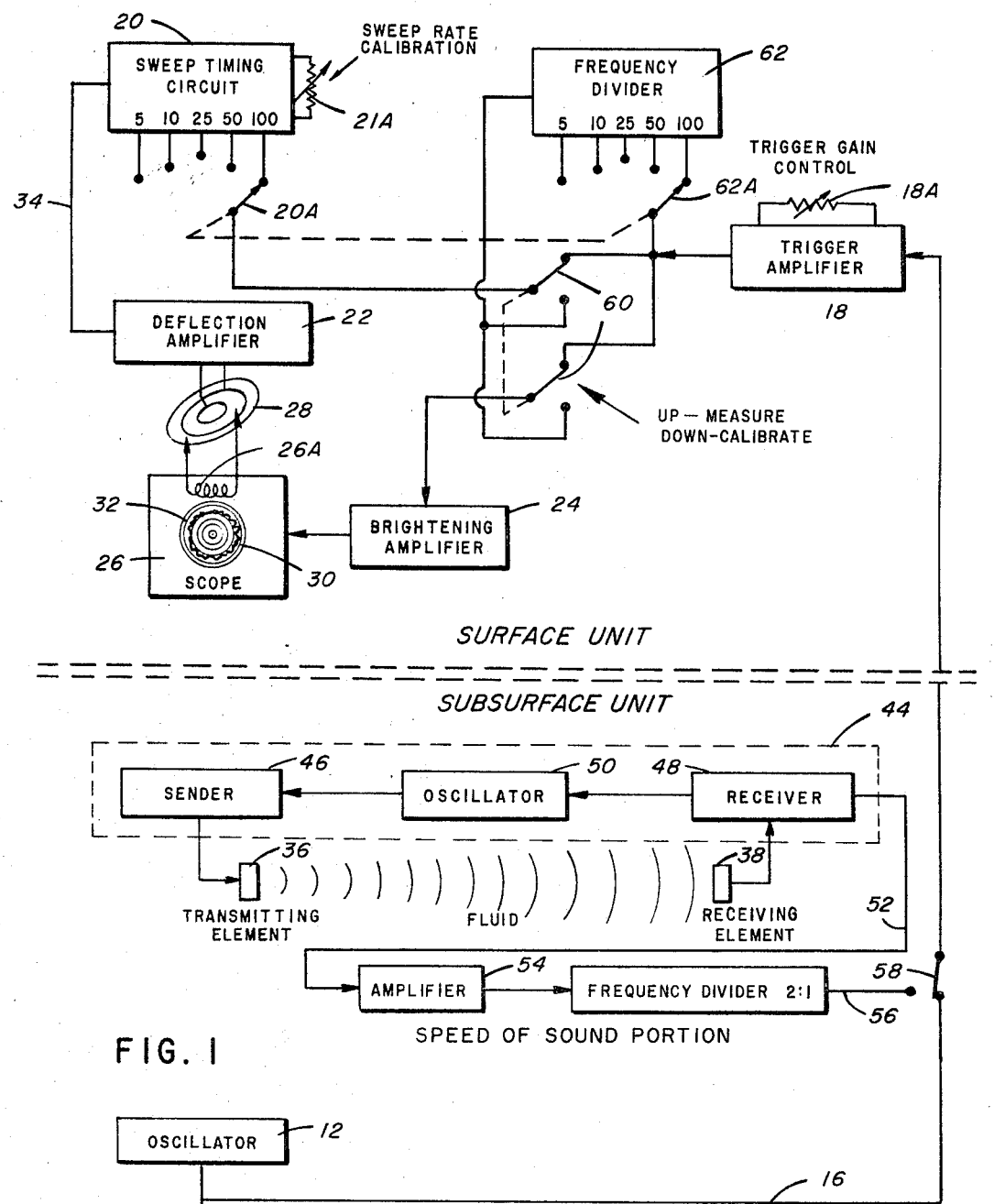
FIGURE 1 is a block diagram of the electrical components of the apparatus of this invention.

Referring to the drawings and first to FIGURE 1, the basic electrical components of the invention are shown in block diagram. The apparatus by which the invention is practiced can be divided basically into a surface unit and a subsurface unit, it being understood that some of the elements shown in the block diagram of FIGURE 1 can equally as well be physically positioned in either the surface or subsurface unit.

The basic portions of the subsurface unit which form a part of the known type of sonar type cavern measuring devices include a transducer 10 which is adapted to receive electrical pulses and convert such pulses into sound waves. The sound waves travel through the cavern fluid and encounter the cavern wall, as indicated, and are reflected as an echo back to the transducer. Transducer 10 then functions to convert the echo into an electrical pulse. The time elapse between the transmission of the sound wave by the transducer and the receipt of the echo is directly proportional to the distance from the transducer to the cavern wall. Obviously the speed of sound transmission of the cavern fluid must be known in order to convert the lapsed time measurements into distance measurements. The balanced of the basic components of the subsurface unit making up the known type of sonar type apparatus for use in measuring underground caverns includes an oscillator 12 which functions to actuate the transducer by sequential voltage spikes to impart sequential sound pulses in the cavern fluid and a motor 14 which rotates the transducer 10 to provide a complete circumferential measurement of the cavern walls. Electrical signals indicating the initiation of the sound wave in the transducer 10 by oscillator 12 and the receipt of the echo by the transducer are conveyed to the surface by means of conductor 16.

The basic surface components which make up a known type of sonar apparatus for measuring caverns includes a trigger amplifier 18; a sweep timing circuit 20; a deflection amplifier 22; a brightening amplifier 24; and a plan position indicator 26. Typically the trigger amplifier 18 includes a trigger gain control 18A and the sweep timing circuit 20 includes a range control 20A and a sweep rate calibration control 20B. The plan position indicator 26 includes a deflection yoke 26A including means of rotation thereof (not shown), the deflection signal being supplied to the yoke through slip rings 28. The plan position indicator 26 includes a screen 30 having circumferential spaced distance markers 32 superimposed thereon. Thus, the elements 10 through 32 make up the basic components of the known type of sonar apparatus for measuring underground caverns, it being understood that such basic apparatus typically includes many embellishments and is subject to a great many various embodiments.

Figure 4:
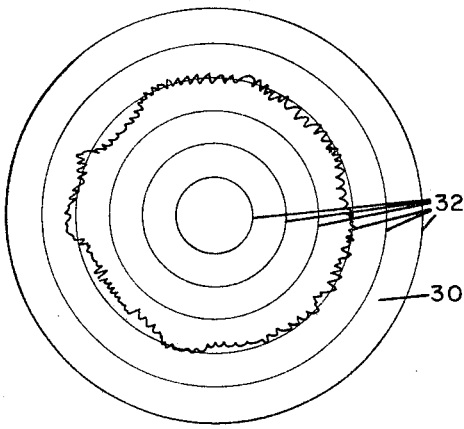
FIGURE 4 is the view of the screen of a plan position indicator having circumferential distance markers thereon showing a typical display of the measurement of a cavern wall utilizing the appartaus of this invention.

The known type of sonar apparatus for measuring underground caverns just described functions generally as follows: Oscillator 12 sequentially functions to actuate transducer 10 at a preselected rate, such as 5 pulses per second. The transducer initiates sound pulses in the cavern fluid which are propagated outward to strike the cavern wall, each resulting in an echo which is received by the transducer. The initiating pulse of oscillator 12 and the echo pulse for transducer 10 are transmitted by way of conductor 16 to the surface to trigger amplifier 18 to provide, on each transmission cycle, an initiating pulse corresponding to the initiation of sound in the fluid followed by an echo pulse. These pulses are transmitted to the sweep timing circuit wherin the first pulse received, being the pulse generated by oscillator 12, initiates a sweep voltage which is applied by conductor 34 to the deflection amplifier 22 and through slip rings 28 to yoke 26A of the plan position indicator. This initiates a sweep of the indicator beam which travels radially outwardly from the center point. The output of trigger amplifier 18 is fed to brightening amplifier 24 so that the beam is brightened when the echo pulse is received. The transducer 10 is rotated by motor 14 in synchronization with the rotation of the deflection yoke 26A so that a resultant outline of the interior configuration of the cavern is displayed upon screen 30, such as shown in FIGURE 4. By means of the overlying circumferential distance markers 32 the dimensions of the cavern are shown. However, the resultant measurements of FIGURE 4 are relatively meaningless unless the velocity of sound transmission of the cavern fluid is known. As indicated heretofore the most common means of determining this velocity was by means of analysis of physically removed samples of the fluid. This invention provides a means of automatically correcting the apparatus for the speed of sound transmission of the fluid obviating the necessity of recovering a sample of the cavern fluid for chemical analysis.

Basically, this invention includes spaced apart sound transmitting and receiving elemnts in the cavern fluid, means establishing a sequence of sound pulses traveling from the transmitting element to the receiving element repetitiously to provide a pulse repetition frequency signal proportional to the speed of sound transmission of the cavern fluid, the pulse repetition frequency signal having connection to the sweep timing circuit and the brightening amplifier of the sonar apparatus so that a radial sweep of the plan position indicator beam is established having brightened spots representative of known distances of sound travel in the cavern fluid, whereby the sweep rate calibration of the sweep timing circuit can be adjusted to calibrate the sweep timing rate relative to the circumferential distance markers on the scope to provide a calibrated rate proportional to the speed of sound transmission of the cavern. This general description of the invention having been giving a more particular description will now be provided.

Figure 2:
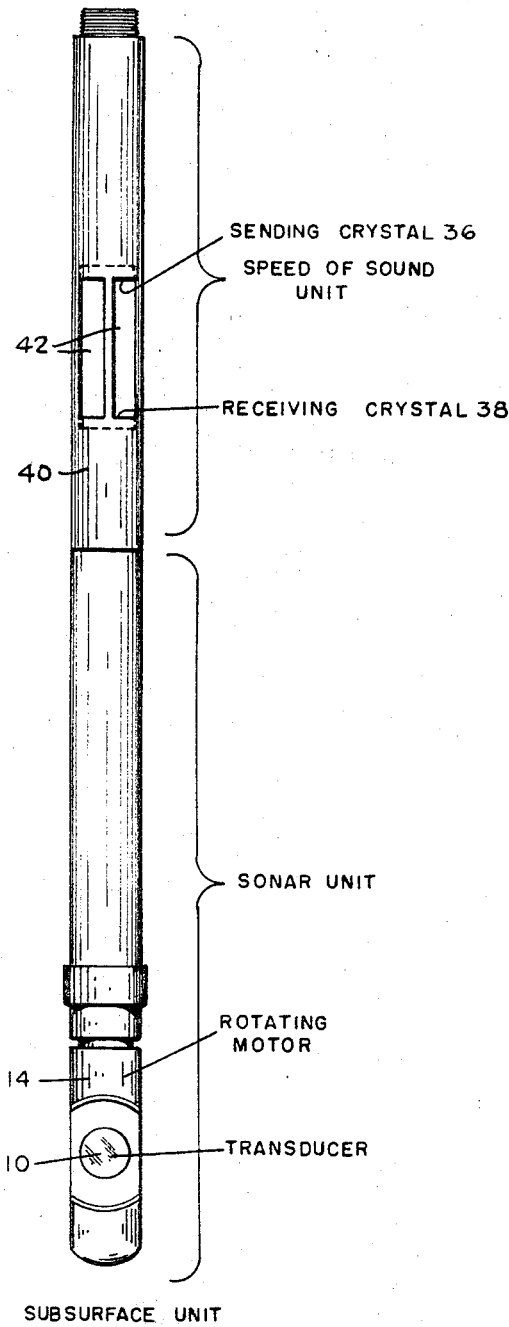
FIGURE 2 is a side elevational view of a typical subsurface unit adapted to be lowered into a cavern for the measurement thereof and including the elements utilized for calibration of the instrument for the speed of sound transmission of the cavern fluid.

Carried by the subsurface unit in an arrangement wherein the cavern fluid completely permeates the space therebetween, is a transmitting element 36 and a receiving element 38. The elements 36 and 38 are typically crystals, the transmitting crystal 36 functioning to impart sound pulses in the cavern fluid actuated by a voltage pulse and the receiving element 38 functioning in the obverse, that is, to generate an electrical pulse when the sound pulses having passed through the cavern fluid are received. As an example of the embodiment of the downhole unit, FIGURE 2 shows the transmitting element 36 and receiving element 38 supported by a tubular structure 40 with windows 42 so that the space between the elements 36 and 38 is always filled with the cavern fluid when the unit is in operation.

Referring again to FIGURE 1, electrically connected both to the transmitting element 36 and the receiving element 38 is a speed of sound transmitter portion generally indicated by the numeral 44 which functions to receive the electrical pulse from receiving element 38 to instantaneously self-regenerate a voltage pulse to actuate sending element 36 thereby to establish a self-regenerated pulse repetition frequency signal. In the typical arrangement the transmitter 44 consists of a sender portion 46 having electrical connection to the transmitting element 36; a receiver portion 48 having electrical connection to the receiving element 38; and an oscillator portion 50 having electrical connection to both the sender portion 46 and receiver portion 48. The oscillator portion 50 functions, when energized, to initiate sequential voltage pulses which in practice may have a normal frequency rate of aproximately 3,500 cycles per second. The oscillator pulse output is connected to the sender 46 which functions in the nature of an amplifier providing output pulses to actuate transmitting element 36.

Receiver portion 48 functions to receive and shape the electrical signal from the receiving element and at the output thereof to actuate oscillator portion 50. With the transmitter 44 energized, oscillator 50 initiates a pulse which is amplified in sender 46 to actuate the transmitting element 36 causing a sound wave pulse in the cavern fluid. This is transmitted to the receiving element 38 which converts the sound wave into an electrical pulse which is amplified by receiver portion 48 and in turn actuates oscillator 50. The received pulse after suitable amplification and reshaping in the receiver portion 48 is again applied by way of the oscillator portion 50 to the sender 46, thus the transmitter 44 regenerates and establishes a pulse repetition frequency the rate of which depends on the speed of sound traveling from the transmitter element 36 to the receiving element 38. Of course there may be some electrical and other delays, however, such delays are inconsequential when proper circuit parameters are used.

In a typical arrangement the transmitting element 36 and receiving element 38 are placed exactly six inches apart. Oscillator 50 is set to have a normal period of oscillation of 3,500 cycles per second which is substantially below the pulse repetition frequency of any liquid to be encountered in operation. In most cavern brine solutions the pulse repetition frequency of transmitter 44 with the elements 36 and 38 six inches apart is in the neighborhood of 13,000 cycles per second. Thus, the oscillator portion 50 functions primarily as a means of initiating the regenerative cycle of the transmitter.

The pulse repetition frequency signal which is proportional to the speed of sound transmission of the cavern fluid is carried from the transmitter by conductor 52, and applied to amplifier 54. In the exemplified arrangement wherein the elements 36 and 38 are spaced six inches apart, a frequency divider 54 may be employed having a two for one frequency division ratio so that the output at conductor 56 provides a pulse repetition frequency in which the time between pulses of the signal at conductor 56 represents the time required for sound to travel one foot in the cavern fluid.

Conductor 56 connects through a switch 58 to conductor 16 for transmission of the pulse repetition frequency signal to the surface.

In the surface unit the pulse repetition frequency signal is amplified by trigger amplifier 18 and when switch 60 is in the calibrate position the amplified signal is applied by way of a frequency divider 62 to brightening amplifier 24 and to sweep timing circuit 20.

Figure 3:
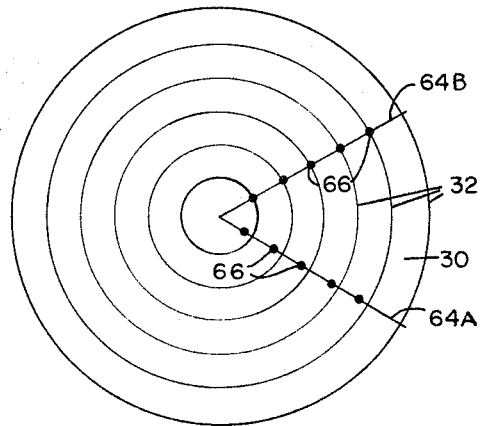
FIGURE 3 is a view of the screen of a plan position indicator as utilized as a portion of the invention having circumferential distance markers thereon and showing two examples of the appearance of the beam sweep when the apparatus is being calibrated.

Referring to FIGURE 3, the scope face 30 is shown having the spaced circumferential distance markers 32 superimposed thereon. Typical calibrating sweep traces 64A and 64B are shown. Each sweep trace initiates from the screen center and travels radially outwardly. During calibration the travel of the sweep trace from the screen center is instigated by a voltage pulse of the pulse repetition frequency signal. Each sequential equally spaced pulse of the pulse repetition frequency signal (having passed through frequency divider 62) is applied to brightening amplifier 24 which results in the formation of spots 66. Thus, the distance between each of the sequential spots 66 represents a particular time interval depending on the physical parameters of the calibrating system and the setting of the frequency divider. With the range selector switch 20A and 62A set on five feet the sweep travels at a rate such that a maximum equivalent of five feet radius is displayed on the screen corresponding to the distance marker overlays 32. When the five feet range is selected frequency divider 62 functions only as a direct conductor of the pulse repetition frequency pulses, in other words, at this range there is no further division of the pulse repetition frequency signal. It is noted that in sweep 64A the calibrating dots 66 do not coincide with the circumferential range overlay 32 which means that the apparatus is out of calibration or, in other words, that the rate of sweep of the beam as shown on line 64A is not proportional to the velocity of sound transmission of the cavern fluid.

To calibrate the instrument the sweep rate calibration control 20B is adjusted to vary the sweep rate to correspond proportionally to the velocity of sound transmission of the cavern fluid by aligning the dots 66 to correspond with the range scale 32 as shown on sweep line 64B. With the sweep rate calibrated so that the pulse repetition frequency calibration signal provides dots corresponding to the distance markers the device is calibrated and ready to be used for measuring a cavern.

When the device is calibrated as just described, all that is required to measure the cavern is to transfer switches 58 and 60 to measure position so that the signal fed by conductor 16 to the sweep timing circuit and brightening amplifier 24 is the signal produced by oscillator 12 and the echo received by transducer 10. Rotating motor 14 is energized to rotate the transducer 10 and the deflection yoke 26A is rotated in synchronization which may be achieved by use of synchronous motors each energized by the same AC voltage supply source. The oscillator 12 provides sequentially voltage pulses which pass by way of conductor 16 to trigger amplifier 18 and thence to sweep timing circuit 20 to initiate beam sweep of the plan position indicator 26. The beam is swept radially outward and the echo received by transducer 10 applies a voltage pulse which also passes through the trigger amplifier and to brightening amplifier 24 to provide a brightening of the beam on the screen 30. Since the sweep timing circuit has been calibrated to move the sweep of the indicator proportional to the speed of sound transmission of the cavern fluid relative to the distance markers 32 the brightened spot will accurately reflect the measurement of the distance from the transducer to the cavern wall. As the transducer 10 and the deflection yoke 26A are rotated in synchronization a visual measured outline of the cavern wall 68 is provided on the indicator screen 30 as shown in FIGURE 4. Notations can be made from the visually presented pattern or photographs taken to record the measurement. No correction factor need be applied to the measured display.

When a different range is utilized the sweep timing circuit selector switch 20A is moved simultaneously with the frequency divider switch 62A so that the calibrating pulse repetition frequency signal is divided to correspond with the range selected. In practice the ranges usually required for measuring caverns are 0 to 25 feet, 0 to 50 feet, 0 to 100 feet, 0 to 250 feet, and 0 to 500 feet. For maximum accuracy the apparatus is calibrated with the range setting which will be utilized for measurement of the cavern.

It is apparent that the calibration of the apparatus for the speed of sound transmission of the cavern fluid is completed without the necessity of taking a physical sample of the fluid and in fact, without the operator knowing the speed of sound transmission of the cavern fluid. That is, the apparatus is calibrated so that the plan position indicator beam travel is proportional to the speed of sound transmission of the cavern fluid without any requirement that the operator know what this speed of sound transmission actually is.

Switches 58 and 60 are preferably operated in unison. The operation of switch 58 which is preferably positioned in the subsurface unit may be accomplished in a variety of ways (not shown) such as the use of relays actuated when the power to the subsurface unit is on. Switch 58 may be positioned in response to a relay actuated by a remote control receiver forming part of the subsurface unit controlled by a preselected frequency signal transmitted down through conductor 16. Obviously, switch 58 may be controlled in unison with switch 60 by relays having direct electrical connection by auxiliary conductors. In some embodiments of the apparatus conductor 60 functions not only to transmit the calibration and measuring signals but also to transmit the power required for operation of the subsurface unit and in this arrangement a 60 cycle rejecting filter is interposed in cable 16 between the subsurface unit and the trigger amplifier.

The term "fluid" as used herein includes both gas and liquid as the apparatus of the invention functions in the same manner in either medium.

While the apparatus of this invention has been described with a great deal of particularity many changes may be made in the details of construction and the arrangement of components without departing from the spirit and scope of this disclosure.

I claim:

1. An apparatus for measuring an underground fluid containing cavern including means of calibration for the speed of sound transmission of the cavern fluid, comprising:
   an indicator means for sequentially displaying elapsed time intervals;
   a sound transmitting element and a sound receiving element supported at a preselected distance from each other in the cavern fluid;
   a calibrating sound transmitter having electrical connection to said sound transmitting element and said sound receiving element including means of applying sound producing voltage pulses to said transmitting element in response to sound pulses received through the cavern fluid by said receiving element to establish a regenerated pulse repetition frequency signal proportional to the speed of sound transmission of the cavern fluid;
   calibrating means with said indicator means whereby said indicator means may be regulated to display selected indicia of time elapsed for the transmission of sound in the cavern fluid between said transmitting and receiving element to thereby calibrate for the speed of sound transmission of the cavern fluid;
   a measuring sound transmitting and receiving means in the cavern providing elapsed time electrical measuring signals in response to the sequential transmission of sound wave pulses in the cavern fluid and the receipt of echos from the cavern wall;
   switch means having calibration and measuring positions including means of selectably applying said pulse repetition frequency signal to said indicator when in said calibration position and applying said electrical measuring signal to said indicator means when in said measuring position; and
   means of rotating said measuring sound transmitting means.

2. An apparatus for measuring an underground fluid containing cavern according to claim 1 wherein:
   said indicator means includes a plan position indicator oscilloscope having a face displaying a beam swept radially from a center point and wherein elapsed time intervals are displayed as brightened spots formed by increased intensity of said beam spaced from the center point; and
   wherein said calibrating means includes a sweep timing circuit having electrical connection to said plan position indicator, the sweep timing circuit having a sweep rate calibration control.

3. An apparatus for measuring an underground fluid containing cavern according to claim 1 wherein said calibrating sound transmitter includes:
   a sender portion having electrical connection with said sound transmitting element including means, when actuated, to apply a voltage pulse to said element;
   an oscillator portion having electrical connection to said sender portion to actuate said sender portion, including means to actuate said sender portions at a preselected minimum pulse rate; and
   a receiver portion having electrical connection with said calibrating receiving element including means in combination with said sound receiving element of converting sound pulses received by said element into electrical pulses, the receiver portion also having electrical connection with said oscillator portion whereby said electrical pulses trigger the oscillator portion to actuate said sender portion whereby the sound transmitter regenerates proportional to the speed of sound transmission of the cavern fluid, the preselected minimum rate of actuation of said oscillator portion being less than the rate of regeneration and serving to initiate regeneration.

4. A sonor type apparatus for measuring an underground fluid containing cavern including means of calibration for the speed of sound transmission of the cavern fluid, comprising:
   a plan position indicator including means of displaying a beam sweep radially from a center point and including spaced circumferential distance markers thereon;
   a sweep timing circuit having electrical connection to said indicator for radially sweeping said beam, the sweep timing circuit having a sweep rate calibration control;
   a calibrating sound transmitting element and a calibrating sound receiving element supported at a preselected distance from each other in the cavern fluid;
   a calibrating sound transmitter having electrical connection to said calibrating sound transmitting element and said calibrating sound receiving element, the calibrating sound transmitting including means of applying a voltage pulse to said calibrating sound transmitting element to initiate a sound pulse in the cavern fluid, the calibrating sound receiving element including means of converting the received sound pulse having passed through the cavern fluid to an electric pulse which in turn is applied to the calibrating sound transmitter whereby the calibrating sound transmitter regenerates and a pulse repetition frequency signal is establlished proportional to the speed of sound transmission of the cavern fluid;
   switch means having calibration and measuring positions selectably electrically connecting, when in said calibration position, said pulse repetition frequency signal to said sweep time circuit and said plan position indicator, whereby the intensity of said beam as it is swept radially is increased by said pulse repetition frequency signal to display a sequence of spaced spots on said indicator representative of known distances of sound wave travel in the cavern fluid and whereby the sweep rate calibration control of said sweep time circuit may be varied to align the spaced spots with said circumferential distance markers whereby the radial sweep of said beam is made proportional to the speed of sound transmission of the cavern fluid;
   a measuring sound transmitting and receiving means in the cavern for transmitting sound waves therefrom and receiving the echos from the cavern wall, the measuring sound transmitting and receiving means having connection when said switch means is in said measuring position, to said sweep timing circuit and said plan position indicator whereby the calibrated radial sweep of said beam thereof is initiated simultaneously with the transmission of sound waves from said measuring transmitter and the intensity of said beam is increased in response to the sound echo; and
   means of rotating said measuring sound receiving and transmitting means and said plan position indicator radial beam sweep in synchronization to display a measured outline of the cavern.

5. A sonor type apparatus for measuring an underground cavern according to claim 4 including:
   a selectably variable frequency divider having electrical connection to receive said pulse repetition frequency signal and provide a proportionately reduced pulse repetition frequency signal output selectably electrically connected to said sweep time circuit and said plan position indicator whereby said display of spaced spots on said indicator represent selectable known distances of sound waves travel in the cavern fluid.

6. A sonar type apparatus for measuring an underground cavern according to claim 4 wherein said calibrating sound transmitter includes:
- a sender portion having electrical connection with said calibrating sound transmitting element including means when actuated to apply a voltage pulse to said element;
- an oscillator portion having electrical connetcion to said sender portion to actuate said sender portion, including means to sequentially actuate said sender portion at a preselected minimum rate; and
- a receiver portion having electrical connection with said calibrating receiving element including said means in combination with said calibrating sound receiving element of converting sound pulses received by said element into electrical pulses, the receiver portion also having electrical connection with said oscillator portion whereby said electrical pulses trigger the oscillator portion to in turn actuate said sender portion whereby the sound transmitter regenerates proportional to the speed of sound transmission of the cavern fluid, the preselected minimum rate of actuation of said oscillator portion being less than the rate of regeneration and serving to initiate regeneration.

References Cited
UNITED STATES PATENTS

| | | | |
|---|---|---|---|
| 2,648,056 | 8/1953 | Jakosky | 340—3 |
| 3,100,885 | 8/1963 | Welkowitz | 340—1 |
| 3,115,615 | 12/1963 | Saper | 340—1 |

RODNEY D. BENNETT, *Primary Examiner.*

J. G. BAXTER, *Assistant Examiner.*

U.S. Cl. X.R.

340—5, 18